United States Patent [19]

Reed

[11] 3,996,691

[45] Dec. 14, 1976

[54] BODY GRIPPING KILLER TRAP

[76] Inventor: Raymond O. Reed, R.R. 3, Waverly, Iowa 50677

[22] Filed: July 11, 1975

[21] Appl. No.: 595,036

[52] U.S. Cl. .............................................. 43/93
[51] Int. Cl.² .................................... A01M 23/26
[58] Field of Search ............. 43/93, 94, 92, 90, 81, 43/88

[56] References Cited

UNITED STATES PATENTS

| | | | |
|---|---|---|---|
| 475,215 | 5/1892 | Goff | 43/94 |
| 1,728,228 | 9/1929 | Coe | 43/90 |
| 1,799,323 | 4/1931 | Ross et al. | 43/81 |
| 1,861,968 | 6/1932 | Lehn | 43/93 |
| 2,457,501 | 12/1948 | Shehe | 43/88 |

Primary Examiner—Warner H. Camp
Attorney, Agent, or Firm—Zarley, McKee, Thomte, Voorhees & Sease

[57] ABSTRACT

A pair of oppositely disposed jaws are pivotally movable between open and closed positions, a spring means on the jaws bias the jaws to a normally closed position and a trigger positioned between the jaws releasably hold the jaws in an open position, the trigger being slideably and partially rotable with respect to the pivotal axis of the jaws. The trigger assembly is so constructed to induce the animal to come further into the trap and when released by an animal cause the animal to fall towards and into the trap jaws rather than away from them.

12 Claims, 7 Drawing Figures

BODY GRIPPING KILLER TRAP

BACKGROUND OF THE INVENTION

This invention relates to animal traps and more particularly to an improved body gripping killer trap. Body gripping killer or humane traps are to be distinguished from conventional leg hold traps. Leg hold traps operate on the principle of heavy, small jaws which upon release snap shut grabbing the leg of the animal and holding it until the trapper next checks his trap.

As can be appreciated for certain types of animals, leg hold traps are not satisfactory. For example, many small animals, particularly such as mink, muskrat, beaver, and the like, cannot be successfully trapped with leg hold traps for the simple reason that they either have sufficient strength to remove their leg from the leg hold jaws or they will simply chew off their leg in an effort to escape. In addition, such leg hold traps are very inhumane because of the suffering they cause to the animal trapped therein.

Body gripping killer traps utilize significantly larger jaws and depend upon the animal's walking into the trap before the jaws are released and snapped closed. The jaws being larger, the animal is grasped by the jaws, normally along its entire rib cage and the rib cage is crushed with near instantaneous expiration of the animal. Thus, killer traps which employ body gripping jaws are not only more humane for the animals being trapped, but they are also more efficient in that the number of escapes is significantly reduced.

While body gripping traps have heretofore been known and utilized, see for example, Conibear, U.S. Pat. No. 3,010,245; Lehn, U.S. Pat. No. 2,947,104; Mau, U.S. Pat. No. 2,701,428, one of the problems with these prior traps has been their trigger release mechanism. As far as is presently known to the applicant, all of these traps depend upon a latch type trigger mechanism which is adapted to hold the jaws in open or set position with a release arm which is designed to positively disengage the latch mechanism when the trigger is actuated by the animal entering the trap. The release arm — latch type mechanism — is inefficient for a variety of reasons. In the first instance, when the release arm is thrown out of the way by the closing jaw, it may have a tendency to throw the animal out of the trap.

In addition, the efficiency of body gripping traps depends upon the animal being well within the trap prior to the closing of the jaws. Thus, any sort of mechanical mechanism which upon release has a tendency to throw the animal outward from the trap represents an inefficiency of the trap. In addition, large cumbersome mechanical pieces make it more difficult to lure the animal into the trap since it is easier for the animal's suspicion to be aroused. As a result, the only practical method of using presently available body gripping traps is to utilize them when the trap is concealed, for example, under water or in a den or tunnel.

Accordingly, one subject of this invention is to provide for an improved body gripping trap having a smaller and more quickly releasable trigger mechanism.

Another object of this invention is to provide an improved body gripping trap wherein activation of the trigger release causes the animal to sink deeper into the trap rather than being thrown away from the trap.

Another object of this invention is to provide for an improved body gripping trap which eliminates the need for a latch releasing arm which flips over the jaws when the trap is sprung.

Another object of this invention is to provide for an improved body gripping trap wherein the trigger for the trap consists of a single moving part resulting in a trigger which is safer to set and less apt to be interferred with by pieces of foreign material being lodged in the trigger mechanism.

The method of accomplishing all of the above-stated objectives and others will become apparent from the following detailed description of the invention.

BRIEF DESCRIPTION OF THE INVENTION

DETAILED DESCRIPTION OF THE INVENTION

The improved body gripping killer trap, designated generally as 10, is comprised of a pair of oppositely disposed jaw frames 12 and 14. Jaw frame 12 is comprised of side portions 12a and end portion 12b.

Figure 1:
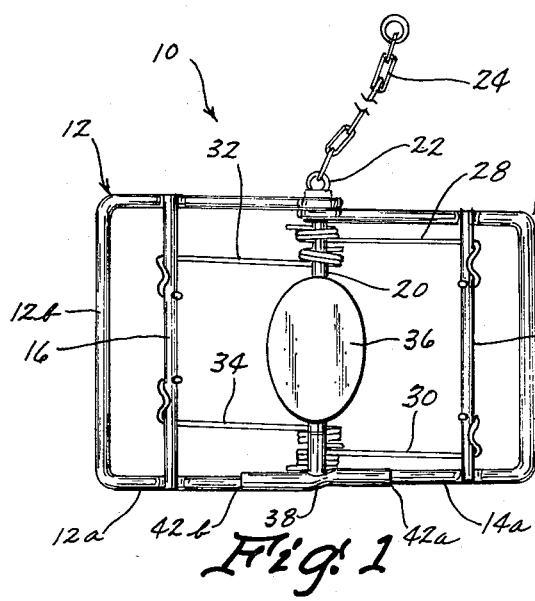
FIG. 1 is a plan view of the body gripping trap of this invention.
Figure 5:
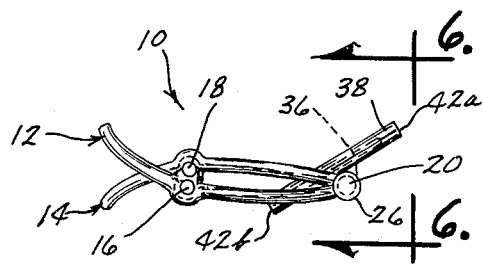
FIG. 5 shows the trap of this invention in closed position.
Figure 6:
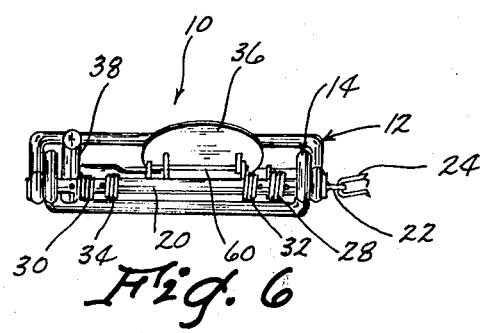
FIG. 6 shows a view of the trap in closed position along line 6—6 of FIG. 5, showing the position of the trigger mechanism after release.

In like manner, jaw frame 14 is comprised of side portions 14a and end portion 14b. In plan view, as seen in FIG. 1, each of the jaws are generally U-shaped. Preferably, both of the jaws are of substantially the same width, but one of the jaw frames is slightly shorter and narrower than the other; for example, side portions 14a could be slightly shorter than side portions 12a, and end portion 14b slightly narrower than end portion 12b so that when the jaws are closed, as seen in FIG. 5, one jaw will fit within the other.

Extending from one side portion 12a to the other side portion of jaw frame 12 is a cross support bar 16. In like manner, a cross support bar 18 extends from one side portion 14a to the other side portion of jaw frame 14. Cross support bars 16 and 18 not only provide for an attaching position for the leverage of the spring biasing means as hereinafter described, but in addition provide for increased crushing force against the sides of an animal when the jaw frames snap closed.

The ends of each side portion 12a and each side portion 14a are provided with an apperture, not specifically depicted, and pin 20 passes through each of these appertures. As a result, the jaws are pivotally mounted around pin 20 and movable between open and closed positions. One end of pin 20 can have a ring member 22 for attachment of a trap holding chain 24. The opposite end of rod or pin 20, after passing through the appertures in the jaw frame, can be riveted as shown at 26 to prevent the jaw frames from slipping off of pin 20. Other conventional fastening means could also be employed.

Spring 28 extends from pin 20 to cross support 18 and is coiled around rod 20 with its end through rod 20 to provide a biasing force urging jaw 14 to a normally closed position. In like manner, spring 30 extends from pin 20 to cross support 18. Springs 32 and 34 extend from pin or rod 20 to cross support 16 and normally urge jaw frame 12 into a closed position. Of course, the number of springs or biasing means on the jaws to bias the jaws to a normally closed position is not critical and if desired, one spring for each jaw is sufficient, or a plurality of springs for each jaw can be utilized.

Figure 2:
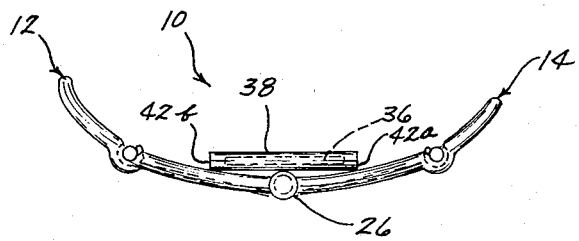
FIG. 2 is an elevated end view looking in the direction from FIG. 2 toward FIG. 1.

As can best be seen in FIG. 2, the jaws of the trap when in an open position, preferably provide an arcuate or partially circular shape in order for the jaws to conveniently, when in an open position, to be fitted in a drainage tile or in a like configuration wherein the trap will be mounted against an arcuate to semicircular shaped support. Of course, this feature is not critical to the invention, and if desired the jaws can form a flat surface when in an open position in order for setting along a conventional animal trail.

Figure 3:
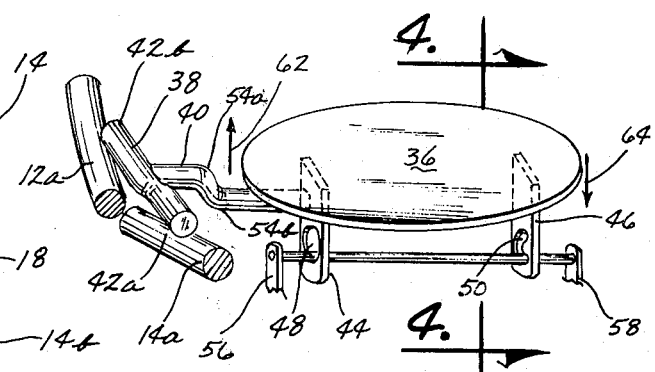
FIG. 3 is an exploded perspective view showing in detail the trigger mechanism of the body gripping trap of this invention.
Figure 4:
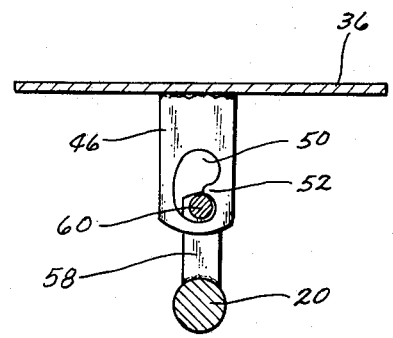
FIG. 4 is a view along line 4—4 of FIG. 3.

The details of the trigger mechanism are perhaps best shown in the views of FIGS. 3 and 4.

As can be seen in FIG. 3, a trigger is positioned between the jaws 12 and 14 to releasabley hold the jaws in an open position. The trigger is slideable and partially rotatable with respect to the pivotal axis of the jaws. In particular, the trigger comprises a jaw holding portion and a pan portion 35. The jaw holding portion is comprised of a T-shaped member having a cross portion 38 and a stem portion 40. Cross portion 38 fits between the open jaw side portions 12a and 14a and holds the jaw frames in an open position. Cross portion 38, as shown herein, has somewhat offset ends 42a and 42b and can comprise a round shaped wire stock with a tapered end, or the like. If needed or desired, side portions 12a and 14a can have a slight notch or serration to more effectively hold the jaws in open position. If a flat wire stock is utilized, it preferably is mounted so that only a small portion of its edge, at ends 42a and 42b, is in actual contact with jaw member 14a, in order to allow for a very quick release of the trap.

As shown in FIG 3, stem portion 40 is preferably bent in order to provide for pan 36 and cross member 38 to be substantially in the same place.

Spaced apart, downwardly extending tabs 44 and 46 are mounted on the bottom side of pan 36. Downwardly extending tab 44 has a substantially oval shaped apperture 48. Tab 46 has a substantially oval shaped apperture 50; however, in addition, tab 46 has an inwardly presented projection 52, the purpose of which will be described hereinafter.

Stem 40 below bends 54a and 54b and under pan 36 is attached and its end opposite cross member 38 to tab 44.

In the embodiment of FIGS. 3 and 4, extending upwardly from pin 20 are spaced apart upwardly extending tabs 56 and 58. As depicted in FIG. 3, tabs 56 and 58 are spaced apart further than downwardly extending tabs 44 and 46. In one embodiment the stem portion 40 is of a proper length such that when the trigger is set, tab 44 can be immediately adjacent tab 56 so that when pan 36 is depressed, the bottom part of tab 44 presses against the inside, side surface of tab 56 further inducing an upward movement of "T" portion 38 away from sides 12a and 14a.

Extending between tabs 56 and 58 is a round support rod 60. Support rod 60 also extends through oval shaped apperture 48 in tab 44 and oval shaped apperture 50 in tab 46. In addition, inwardly presented projection 52 rides on top of support rod 60. As a result, downward pressure on pan 36 causes the pan to partially rotate downwardly with respect to rod 60. Thus, pan 36 is both freely slideable and partially rotable with respect to rod 60.

In another embodiment of the invention, downwardly extending tabs 44 and 46 are rotably and slideably mounted directly on pin 20 eliminating the need for rod 60 and upstanding tabs 56 and 58. The laternate embodiment is preferred with body gripping traps, and FIG. 3 is preferred with leg hold traps. However, if desired both can be used in either situation.

In actual operation, the trap works as follows: The jaws 12 and 14 are forced open to the position shown in FIGS. 1 and 2. The pan 36 is slid towards jaw portions 12a and 14a and cross member 38 is positioned there between in a manner to provide only sufficient minimum contact between ends 42a and 42b and side portions 14a, and correspondingly the same with respect to side portion 12a and the edge not shown in FIG. 3, to provide for a releasable holding of the jaws 14a and 12a in open position.

Springs 28, 30, 32, and 34 are urging jaws 12 and 14 and correspondingly side portions 12a and 14a to a closed position with the result being an upward force as depicted by arrow 62 being constantly urged against cross member 38 and stem member 40 and correspondingly the front portion of the pan 36. The rear portion of the pan, as a result of the upward urging of the front portion of the pan, will be urged downwardly as depicted by arrow 64 with the result being that inwardly presented projection 52 is forced against support rod 60.

When an animal nudges pan 36 in any direction, only a slight movement will cause T-member 38 to become ajar with the result being that the jaws of the trap will snap shut. In addition, any downward pressure on pan 36 by the foot of an animal will not only cause T-member 38 to be moved ajar, but will in addition, because of the inwardly presented projection 52, cause the pan to rotate to one side or the other and downwardly. The result will be that the animal will be thrust further into the trap rather than thrown outward away from the trap upon release of the trigger mechanism.

Figure 7:
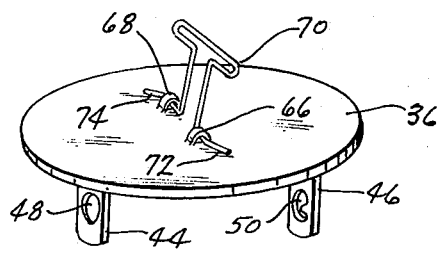
FIG. 7 is a perspective view of a preferred pan for the trap of this invention.

FIG. 7 shows another embodiment wherein strap portions 66 and 68 are cut and bent upwardly from the surface of pan 36. Wire 70 bent in the shape of a "T" at end 72 passes under the strap 66 and is slightly bent rearwardly. Correspondingly, end 74 passes through strap 68 and is slightly bent forwardly. As a result, the "T" portion of wire 70 can either be in an upright position, as shown in FIG. 7, or manually pushed flat against the pan surface. When in a upright position, as shown in FIG. 7, the wire "T" can function when the trap is set to set off the trigger. Any force jarring wire "T" 70 will jar pan 36 and set off the trigger release. This is especially valuable in underwater trap settings to trap animals which may try to swim through the trap without actually setting a foot against pan 36. For trial sets, the wire "T" 70 can be pressed down to its non-usable position.

Several additional practical advantages are obtained by the improved trap of this invention. The fact that the trigger mechanism only uses one moving part means substantially less risk of mechanical failure of the trigger mechanism. The use of oversized appertures 48 and 50 is preferred in order to assure that no dirt or interferring mud or the like will prevent the working of the trigger mechanism. Since the trigger mechanism only consists of a single moving part, it is much safer and more secure to set than conventional mechanisms. The fact that the pan rolls to one side or the other during release allows the animal to sink much deeper into the trap before the trap closes against the animal. The use of a trap having arcuate shaped jaws, when viewed from the end, allows the trap to be placed in a drain tile or a burrow and yet function properly without striking the opposite wall portion of the drain tile or the burrow. In addition, the trigger mechanism utilized for the trap of this invention is compact, making it easy to carry a plurality of the traps in a knapsack of the like without bulky protrusions making compact carrying virtually impossible. Thus, as can be seen, the trap as herein described accomplishes at least all of the stated objectives of this invention.

What is claimed is:

1. An improved body gripping killer trap comprising, a pair of oppositely disposed jaws,
   means pivotally mounting said jaws for movement about an axis between open and closed positions,
   biasing means on said jaws to bias said jaws to a normally closed position,
   a trigger having a pan portion and a jaw holding portion positioned between said jaws to releasably hold said jaws in an open position, means mounting said trigger for slidable and partially rotatable movement of said trigger about the pivotal axis of said jaws,
   said trigger, including said pan portion and said jaw holding portion, when released moving towards the pivotal axis of said jaws whereby any animal that released said trigger is thrust deeper into said jaws.

2. The body gripping killer trap of claim 1 wherein said jaw hold portion is a "T" shaped member, and said pan portion is a flat pan having a top side and a bottom side, said mounting means including downwardly extending tabs attached to said bottom side, the stem of said "T" shaped member being attached to at least one of said downwardly extending tabs.

3. The body gripping killer trap of claim 2 wherein the bottom side of said pan has two spaced apart downwardly extending tabs, each of said tabs having an oval shaped cut out.

4. The trap of claim 3 wherein said mounting means further includes a pan support rod extending between the oval shaped cut outs, said pan being slidable and partially rotatable with respect to said pan support rod.

5. The trap of claim 4 wherein one of said oval shaped cut outs has an inwardly presented projection which rides over said pan support rod.

6. The trap of claim 4 wherein said oval-shaped cut outs are larger than the pan support rod which extends therethrough.

7. The trap of claim 1 wherein each of said jaws has a cross support bar.

8. The trap of claim 7 wherein said biasing means extends from each of said cross support bars to a jaw frame pin which forms said axis for the pivotal movement of said jaws.

9. The trap of claim 8 wherein said jaw frame pin has a pair of spaced apart upstanding tabs said trigger including a pan and said mounting means including a support rod extending through said tabs.

10. The trap of claim 1 wherein one jaw is slightly shorter than the other and fits within the other when said jaws are in closed position.

11. The improved body gripping killer trap of claim 1 wherein said jaws provide an arcuate shape when in open position.

12. The trap of claim wherein said pan portion has mounted on its upper surface a trigger setoff lever which is movable from an upright position to a down position.

* * * * *